United States Patent

[11] 3,632,116

[72] Inventor Andreas Perge
Bromma, Sweden

[21] Appl. No. 838,782
[22] Filed July 3, 1969
[45] Patented Jan. 4, 1972
[73] Assignee U.S. Philips Corporation
New York, N.Y.
[32] Priority July 8, 1968
[33] Sweden
[31] 9394/68

[54] CENTRAL RECORD SPINDLE
5 Claims, 4 Drawing Figs.

[52] U.S. Cl. ........ 274/10 S
[51] Int. Cl. ........ G11b 17/04
[50] Field of Search ........ 274/10 S

[56] References Cited

UNITED STATES PATENTS

| | | | |
|---|---|---|---|
| 2,689,735 | 9/1954 | Morrison | 274/10 |
| 3,128,101 | 4/1964 | Benwell | 274/10 |

*Primary Examiner*—Leonard Forman
*Assistant Examiner*—Charles E. Phillips
*Attorney*—Frank R. Trifari

ABSTRACT: A record spindle for a record changer having supporting elements for holding a plurality of records. The elements are outwardly resilient in a radial direction with respect to a central housing and their movements are coordinated by a slidable operating member arranged within the housing.

INVENTOR.
ANDREAS PERGE
BY
AGENT

INVENTOR.
ANDREAS PERGE
BY
[signature]
AGENT

CENTRAL RECORD SPINDLE

The invention relates to a central record spindle for a record changer provided with a housing and primary supporting elements for supporting a stack of records which elements are outwardly resilient in the radial direction relative to the housing and can be retracted into the housing, and secondary supporting elements for holding the last record but one and possibly the records lying thereon, which elements are resilient in the radial direction relative to the housing, said primary and secondary supporting elements being capable of making coordinated movements in both the axial and radial directions and relative with respect to each other by means of an operating device arranged in the housing to slide in the axial direction, which device is set into motion by the driving mechanism of the changer and in which the secondary supporting elements are connected on the one hand to a body being movable in the longitudinal direction of the housing and being subject to spring action directed towards the primary supporting elements and on the other hand having projections which upon an upward movement of the operating device explore the wall of the hole of the lowest record by their axial movement and are subsequently moved into the space between the lowest record and the last record by one of the stack.

A record spindle of this kind is known from U.S. Pat. No. 3,046,021. With this known record spindle it appears that as the wall of the hole of the lowest record is explored by the projections of the secondary supporting elements these projections may get stuck in the comparatively rough wall of the hole. The risk that this phenomenon occurs is comparatively great since the record spindle for changing records is designed for the smallest thickness of record commercially available. If the stack of records comprises a comparatively small number of records, particularly if only one record is still present on the spindle, the fact the the projections of the secondary supporting elements get stuck in the wall of the hole of the lowest record may have the result that the stack of records or the last record thereof is lifted so that changing of the records, that is to say, the lowering of the lowest or last record of the stack will not take place.

It is an object of the invention to avoid the above-mentioned drawbacks. This object is accomplished by providing one or more auxiliary clamping elements which are exclusively radially movable by the operating device in coordination with the primary and secondary supporting elements. The clamping elements temporarily hold the lowest record in clamping coaction with the wall of the hole of the record, at least during the exploration of said wall of the hole by the secondary supporting elements.

The invention enables the lowering of the lowest or last record of the stack to be effected with greater reliability.

In a suitable embodiment of the invention, the auxiliary clamping elements are formed by leaf springs connected to the housing of the spindle and extend longitudinally therewith. A free end of the leaf springs perform the movements in coordination with the movements of the primary and secondary supporting elements and are displaceable in the radial direction by means of the operating device.

According to the invention the operating device preferably comprises a body of revolution which is provided with cam faces for the control of the coordinated radial movements of the auxiliary clamping elements and the secondary supporting elements. The cam faces are able to cooperate with the auxiliary clamping elements and secondary supporting elements, and the cam faces for the auxiliary clamping elements are provided with a sloping surface which, when viewed in the upward direction of movement of the operating device, is located in front of a sloping surface of the cam faces for the secondary supporting elements. Accordingly to the invention the auxiliary clamping elements are preferably provided with inwardly bent parts at some distance from their free ends, the cam faces of the body of revolution being able to cooperate with these parts of the auxiliary clamping elements.

In an embodiment of the invention the body of revolution is a control bush mounted on an operating rod, a lost-motion connection being provided between the rod and the bush on the one side and the body to which the secondary supporting elements are connected on the other side. As a result, as the operating rod with control bush moves upwards, the auxiliary elements are initially clamped radially outwards against the wall of the hole of the lowest record while the secondary supporting elements do not undergo a displacement. The displacement of the secondary supporting elements is only effected at the end of the free stroke of the lost-motion connection between rod and bush on the side and the body to which the secondary supporting elements are connected on the other side. According to the invention the body to which the secondary supporting elements are connected is preferably guided on the operating rod.

In another embodiment the free stroke of the lost-motion connection between control bush and body to which the secondary supporting elements are connected is chosen to be smaller than the maximum upward movement stroke of the operating rod, in which during the upward movement of the rod the control bush will contact the said body and subsequently impart an additional upward movement to this body and hence to the secondary supporting elements so that the stack of records supported by the projections of these supporting elements is lifted from the lowest record. As a result of this arrangement sticking together of two lower records of the stack of records is prevented and rapid changing time is thus achieved. In addition, scanning of the diameter of the record to be played, as is known per se can be effected in a simple manner with a record spindle according to the present invention, in the position in which the lowest record of the stack still rests on the primary supporting elements, and the records situated thereabove are lifted from the lowest record.

In order that the invention may be readily carried into effect, it will now be described in detail by way of example with reference to the accompanying diagrammatic drawings, in which.

Figure 1:
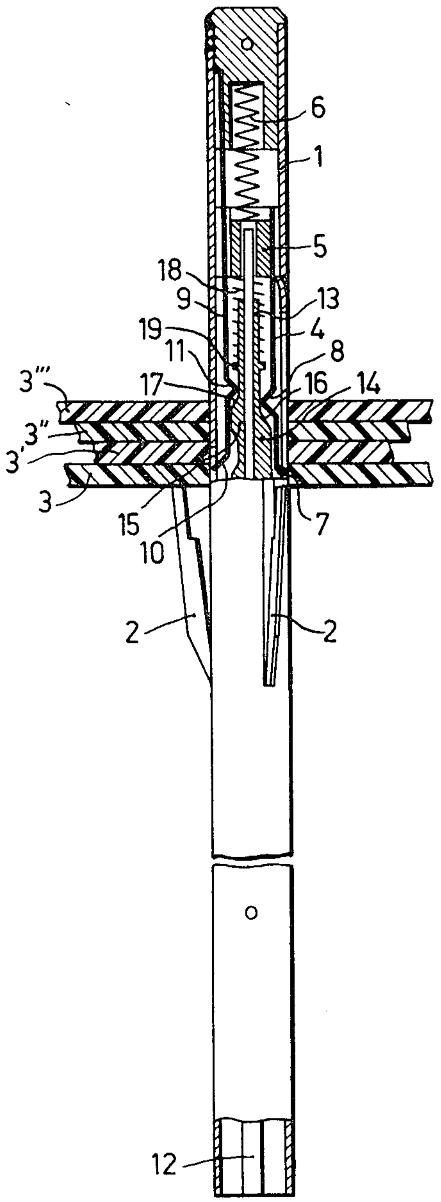
FIG. 1 shows in partial section a record spindle, according to the invention, in the starting position with a stack of records supported by the primary supporting elements.
Figure 2:
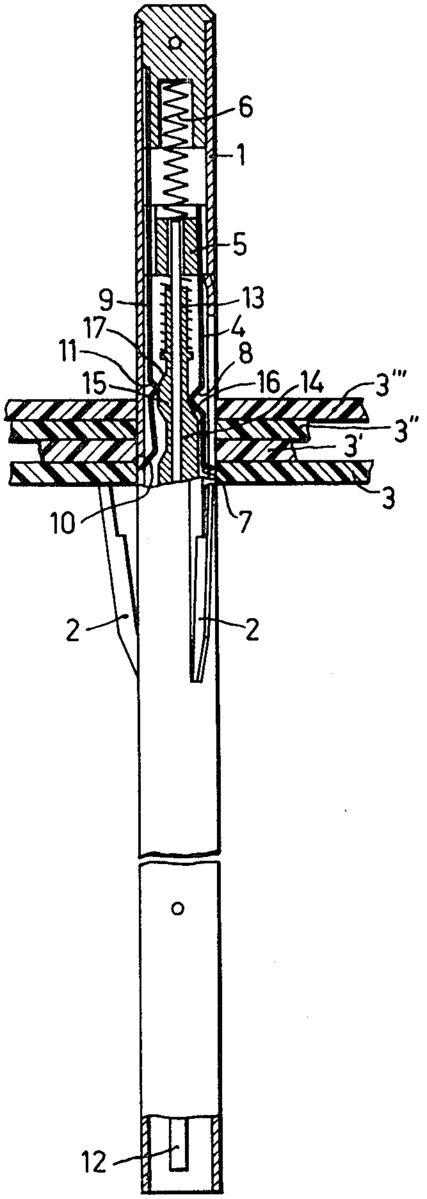
FIG. 2 shows in partial section, the record spindle of FIG. 1 in a position in which the auxiliary clamping elements are clamped against the wall of the hole of the lowest record of the stack in order to temporarily hold this record.
Figure 3:
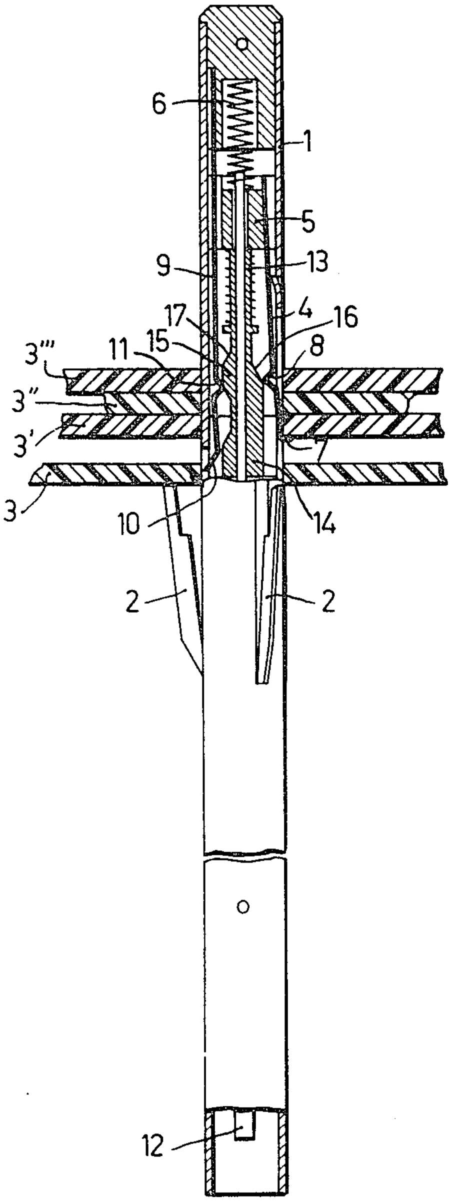
Figure 4:
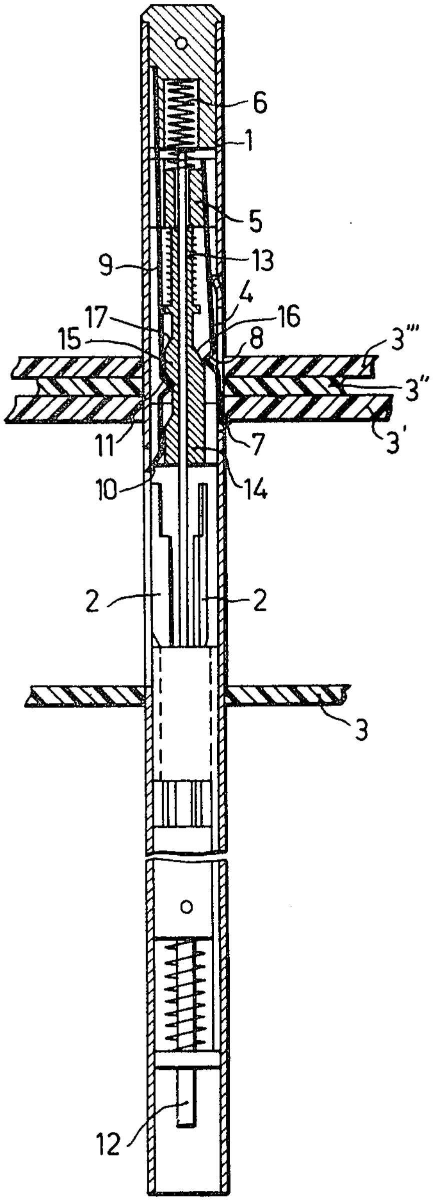

FIG. 3 shows in partial section the record spindle of FIGS. 1 and 2 in a position in which the secondary supporting elements, after exploration of the wall of the hole of the lowest record and movement of said elements into the space between the lowest and the penultimate record of the stack, have lifted the stack supported by the lowest record of this record, the auxiliary clamping elements still clamping the lowest record; and FIG. 4 is a section of the record spindle of FIGS. 1, 2 and 3 in a position in which the lowest record is lowered after elimination of the clamping action of the auxiliary clamping elements and retraction of the primary supporting elements.

According to the drawing, a central record spindle according to the invention comprises a housing 1 and a plurality, three in this embodiment, of equidistant primary supporting elements 2, for supporting a stack of records, 3, 3′, 3″, 3‴,..., said supporting elements being radially outwardly resilient relative to the housing (FIGS. 1, 2 and 3) and capable of being retracted into the housing (FIG. 4) in order to lower the lowest record 3 of the stack on the turntable of a record changer not shown. A plurality, three in this embodiment, of secondary supporting elements 4 placed at a mutual angular distance of 120° is provided for retaining, during changing, the penultimate record 3′ and possibly records 3″, 3‴... lying thereon. The secondary supporting elements 4, which are constructed as leaf springs, are connected on one side thereof to a bush 5 slidable in the longitudinal direction of the housing 1. The bush is loaded by a spring 6 exerting a force on a bush 5 directed towards the primary supporting elements 2. The leaf springs 4, which form the secondary supporting elements, are provided on the other sides thereof with projections 7, and have inwardly bent parts 8 at some distance from the projections 7, the purpose of which parts will be apparent hereinafter.

Furthermore, a number of auxiliary clamping elements 9 (preferably three) are provided which are formed as leaf springs and are exclusively radially movable, in a manner to be described hereinafter, in order to be able to temporarily hold the lowest record 3 in clamping coaction with the wall of the hole of said record. To this end, leaf springs 9, which extend in the longitudinal direction of the housing 1, are connected to the housing at one end while the free end 10 is radially displaceable. The leaf springs 9 are provided with inwardly bent parts 11 at some distance from the free end 10.

The movements of the primary and secondary supporting elements 2 and 4 in both the axial and radial directions and the movements of the auxiliary clamping springs 9 in only the radial direction are controlled in a coordinated manner with the aid of an operating device which is displaceable within the housing in the longitudinal direction and driven by a driving mechanism of the record changer not shown. The operating device comprises an operating rod 12 including a control bush 13 mounted thereon. The bush 13 is provided with cam faces 14, 15 for the control of the coordinated radial movements of the pairs of leaf springs 4 and 9, each cam face 14 having a sloping surface 16 which can coact with the bent part 8 of the spring 4, and each cam face 15 having a sloping surface 17 which can coact with the bent part 11 of the spring 9. The sloping surfaces 17 are located in front of the sloping surfaces 16 when viewed in the upward direction of movement of the operating rod 12. A helical spring 18 surrounds the control bush and engages at one end thereof a collar 19 of the bush 12 13 at the other end thereof engages the bush 5 connected to the springs 4. A lost-motion connection is provided between rod 12 and bush 13 on the one hand the bush 5 on the other hand the purpose of which will be described hereinafter. In the embodiment of the record spindle shown, the bush 5 is guided on the operating rod 12.

The record spindle operates as follows: Starting from the initial position shown in FIG. 1, in which the stack of records 3, 3′, 3″, 3‴.... is supported by the primary supporting elements 2, the springs 9 are spread by cooperation of the sloping surface 17 with the bent parts 11 of these springs during the upward movement of the operating rod 12 and the bush 13. The free ends 10 of the springs 9 are then clamped against the wall of the hole of the lowest record 3 while the springs 4 still occupy their starting position. The position shown in FIG. 2 has thus been reached. As the rod 12 and the bush 13 move further upwards, the springs 4 are moved on the one hand in the axial direction under influence of the force of the helical spring 18 exerted on the bush 5 and against action of the spring, and on the other hand in the radial direction by cooperation of the sloping surface 16 with the bent parts 8, the projections 7 of the springs 4 exploring the wall of the hole of the lowest record to be subsequently moved into the space between the lowest and the penultimate record 3 and 3′, respectively. During this exploring movement the lowest record 3 is held by the clamping springs 9. The end of the free stroke in the lost-motion connection between the bushes 13 and 5 has meanwhile been reached, the bush 13 impinging on the bush 5 with the result that, at least in the embodiment shown, the stack of records 3′, 3″, 3‴... initially supported by the lowest record 3 is lifted off the lowest record 3 by the springs 4 as the operating rod is moved further upward, thus reaching the situation of FIG. 3. In this situation the diameter of the record 3 which is still supported by the primary supporting elements 2 can be scanned. The last operation phase of the spindle is shown in FIG. 4. The bent parts 11 of the clamping springs 9 have passed along the cam face 15 of the control bush 13 so that the clamping action of the springs 9 is eliminated while the primary supporting elements have been retracted into the housing of the spindle so that the record 3 can be lowered. The control of the primary supporting elements is not further described herein as this does not form an essential part of the invention. After a downward movement of the rod 12 and the bush 13 from the position as shown in FIG. 4 the starting position of FIG. 1 is reached again.

It is to be noted that modifications in the embodiments described hereinbefore and shown in the drawing are possible without departing from the scope of the present invention. It is to be noted that, although useful, it is not essential for the invention that the free stroke of the lost-motion connection between the bushes 5 and 13 be smaller than the maximum upward stroke of the rod 12. In other words that the stack of records 3′, 3″, 3‴... supported by the lowest record 3 be lifted off said record for the diameter scanning of the lowest record to take place. Said diameter scanning can also be performed in different manners known per se, for example, in an intermediate position of the lowest record when it already moves towards the turntable.

What is claimed is:

1. A record spindle for a record changer comprising a housing, a plurality of primary supporting elements for supporting thereon a stack of records, said primary elements being arranged so as to be retractable into said housing, a plurality of secondary supporting elements mounted at one end thereof to a movable body within said housing for axial movement, the other end thereof being radially resilient and having a projection which is extendible through said housing for exploring the wall of the hole of the records, spring means for urging said secondary supporting elements toward the primary supporting elements, an operating rod slidably mounted within said housing for axial movement so as to coordinate the axial and radial movement of said primary and secondary supporting elements so that when said operating rod is moved upwards by the driving mechanism of the record changer said projection of the secondary elements will be caused to be inserted between the lowest and penultimate records and support the remainder of the stack, at least one leaf spring connected at one end thereof to said housing and extending axially therein, a finger attached to the other end of said leaf spring for radial movement with respect to said housing for engagement with said records, cam means connected to said operating rod arranged for cooperation with projections on said secondary supporting elements and said leaf spring so that as said operating rod is caused to be moved upwards the axial and radial movements of said secondary elements will be coordinated with the radial movements of said finger on said leaf spring, whereby said finger will act to engage the wall of the hole of the lowest record in the stack to temporarily clamp it in place while said secondary supporting elements explore the wall of said hole.

2. The record spindle according to claim 1 wherein said cam means comprises a first cam member for engagement with a radially inward projection on said leaf spring having an axially extending sloping surface, and a second cam member having an axially extending sloping surface for engagement with a radially inward projection on said secondary supporting element, the sloping surface of said first cam member being located in front of the sloping surface of said first cam member when viewed in the upward direction of movement of the operating member.

3. The record spindle according to claim 2 further comprises a control bush mounted on said operating rod, and a lost-motion connection provided between the operating rod and the bush on the one side and the body to which the secondary supporting elements are connected on the other side.

4. The record spindle according to claim 3 wherein the body to which the secondary supporting elements are connected is guided on the operating rod.

5. The record spindle according to claim 4 wherein the free stroke of the lost-motion connection between control bush and body to which the secondary supporting elements are connected is chosen to be smaller than the maximum upward movement stroke of the operating rod, in which during the upward movement of the rod the control bush will contact the said body and subsequently impart an additional upward movement to this body and hence to the secondary supporting elements, so that the stack of records supported by the projections of these supporting elements is lifted from the lowest record.

* * * * *